INVENTOR:
COLIN W. DEE

INVENTOR:
COLIN W. DEE

United States Patent Office 3,510,176
Patented May 5, 1970

3,510,176
ROTARY HYDROSTATIC BEARING
Colin William Dee, Bournemouth, England, assignor to Aerostatic Limited, Poole, England, a corporation of Great Britain
Filed Mar. 4, 1968, Ser. No. 710,258
Claims priority, application Great Britain, Mar. 6, 1967, 10,538/67
Int. Cl. F16c 17/16
U.S. Cl. 308—9                            6 Claims

ABSTRACT OF THE DISCLOSURE

A hydrostatic bearing having one member rotating relative to another member and the other member having a plurality of circumferentially spaced elongated slot openings and recesses located at the ends of the openings.

---

This invented relates to hydrostatic liquid bearings, that is to say bearings of the kind in which the bearing surfaces of the two relatively movable members are kept separated by a film of lubricant liquid in the bearing volume.

In pressurised liquid bearings, the two most important design factors are the respective resistances to flow of the inlet restrictors, and of the flow paths through the bearing clearance. Where the bearing local clearance decreases under load the resistance of the film increases locally relative to the resistance of the adjacent inlet restrictor, thereby increasing the local static pressure in the bearing film and thus providing a restoring force. Where local clearance increases due to load, the local static pressure is reduced in the same way, thus providing a restoring force. Where local clearance increases due to load, the local static pressure is reduced in the same way, thus providing a restoring force in opposition to the load in this case also. Differences in bearing design relate principally to the form of the primary restrictor, and the more commonly used types may be divided into the following categories:

(i) Orifice restrictors wherein the pressure loss in the inlet hole is due to the aceleration of the fluid in passing through a small orifice;

(ii) Capillary restrictors wherein the fluid passes through a narrow but relatively long bore, and wherein the pressure drop is due to viscous losses;

(iii) Continuous circumferential slot restrictors, in which the liquid passes through a continuous narrow slot. If the length of the slot, in the direction of flow, is large relative to its width, the pressure drop is due to viscous losses.

The above listed forms of primary restrictor are subject to disadvantages, as given below:

(i) Orifice restrictors (1) Problem of making small orifices.—In order to achieve the required pressure drop through orifice restrictors, while limiting consumption of bearing liquid, it is necessary that the orifices shall be made very small in diameter. This raises problems of manufacture, particularly in small bearings, and especially so when ceramic materials are utilised.

(2) Dispersion losses.—To keep manufacturing costs an an acceptably low level, and/or to keep liquid consumption within the required limits it is usually necessary to limit the number of inlet orifices. The flow from each orifice has to spread out angularly to feed the appropriate segment of the bearing volume. This dispersion results in a loss of load-bearing capacity and bearing "stiffness," which increases in magnitude as the number of orifices is decreased or the length-to-diameter ratio of a journal bearing is reduced. This disadvantage applies more particularly to bearings without recesses or pockets.

(3) Ssensitivity to changes in liquid characteristics.—
The orifice restrictor suffers the disadvantage that the means causing the pressure drop in the restrictor is not the same as that causing the pressure drop in the bearing volume, so that each of them is affected in a different way by changes in the characteristics of the bearing liquid. As a result, a change in liquid characteristics (e.g. of temperature) can cause a movement of the bearing operating point away from the optimum design point, thus reducing load-bearing capacity and stiffnes. A bearing with orifice restrictors therefore has to be designed for a particular liquid under a particular set of conditions.

(4) Rotational torque.—It is difficult in practice to ensure in journal bearings that the axis of each orifice is exactly radial to the bearing surface, and if it is not there may arise a rotational torque which is disadvantageous where the bearing is required for torque-sensitive applications.

(ii) Capillary restrictors

Capillary restrictors suffer the same disadvantages, as mentioned under paragraphs (1), (2) and (4) above in respect of orifice restrictors. However, because the pressure loss in both the restrictor and the bearing volume is due to viscosity, they are not sensitive to changes in the liquid characteristics. A change in liquid temperature, for example, would change the viscosity and, therefore, the hydraulic resistance in both the capillary restrictor and the bearing volume by the same amount, and the bearing pressure would remain substantially unchanged.

(iii) Continuous slot restrictors

Continuous slot entries eliminate the problems referred to above under paragraphs (1) and (2), and if the means causing a pressure drop in the restrictor is the same as the means causing a pressure drop in the bearing clearance, they are insensitive to change in liquid characteristics. However, although an improvement is obtained over the orifice restrictor in these respects, continuous slot restrictors suffer from the disadvantage that there is nothing to prevent the liquid from flowing, in the inlet slot, angularly about the axis of the bearing under the influence of pressure gradients which are present when the bearing is loaded. In any pressurised liquid journal bearing there is a certain amount of circumferential flow in the bearing clearance from the high pressure (small clearance) side to the low pressure side. This causes a loss in load-bearing capacity and "stiffness" which increases rapidly with increase in bearing length. The use of a continuous slot restrictor inlet is, in this respect, equivalent to increasing the length of the bearing and has the same deleterious effect on load-bearing capacity.

It is the main object of the present invention to provide an improved form and arrangement of inlet restrictors which extends over a large part of the bearing circumference whilst avoiding rotational flow of the bearing fluid, about the bearing axis, within the restrictor.

A second object is to provide a method whereby inlet restrictors may be obtained by the use of techniques, other than drilling, which are readily applied in practice and with which, in particular, the fluid supply passages may be formed in such a way as to avoid imparting any torque.

According to the present invention, in a rotary hydrostatic liquid bearing, inlet restrictor means are constituted by a purality of angularly-spaced angularly-elongated slots provided in one of two relatively rotatable bearing members between which a bearing volume is defined, said slots opening at one of their ends into the bearing volume and the sum of the angular elongation of these ends of all of the slots, where they open, being a major part of the circumference on which they lie.

It is advantageous if the sum of the elongations of the slots is very much the greater part of the circumference, and a preferred value is greater than 75%, whereby dispersion losses are effectively eliminated.

The use of a plurality of such inlet slots eliminates all of the disadvantages of the orifices restrictors stated above, and the existance of lands between the slots avoids losses due to circumferential flow in the inlet.

The slots may open into a simple bearing clearance or into recesses provided in known manner in one bearing member for the formation of pads of liquid to support the other bearing member.

In a preferred construction of journal bearing, the slots are defined between axially-facing surfaces of two locked elements of one of the bearing members, and in particular between a plane radial face of a first element of the bearing member and an axially-recessed face of an abutting second element of that bearing member.

The term "axially-facing" is herein intended to include both purely radial surfaces, and surfaces including a proportion of axial component.

Advantageously the plurality of slots are symmetrically angularly disposed about the axis of rotation of the bearing. They may readily be obtained in practice for a journal bearing by milling or grinding recesses across a radial face of one element of the bearing member, say in two directions at 90° or in three directions at 60°, and thereafter lapping the remaining lands to obtain the desired thickness of slot, and then abutting a plane radial face of the other element against those lands.

For a thrust bearing they may be obtained by milling or grinding axially along an outer periphery of one element and inserting it within a cylindrical bore of the other element.

Because the recesses can readily be formed to any desired length, being on an exposed surface, the element in which they are formed can be of any desired thickness and strength, and thus be relatively safe under stress, as compared with known constructions in which the thickness of the element it limited by the depth to which it is in practice possible to drill holes of very small diameter.

Where the liquid bearing is a journal bearing, the respective elements by which the slots are defined could be first and second portions of a bearing shell.

Where the liquid bearing is an axial thrust bearing, the respective elements between which the slots are defined could be two portions of a bearing stator, the slots feeding liquid axially into a bearing volume defined between an axially facing surface of the stator and the axially facing surface of the rotor.

Two embodiments of hydrostatic liquid bearings are hereinafter particularly described with reference to the figures of the accompanying drawing, wherein.

Figure 1:
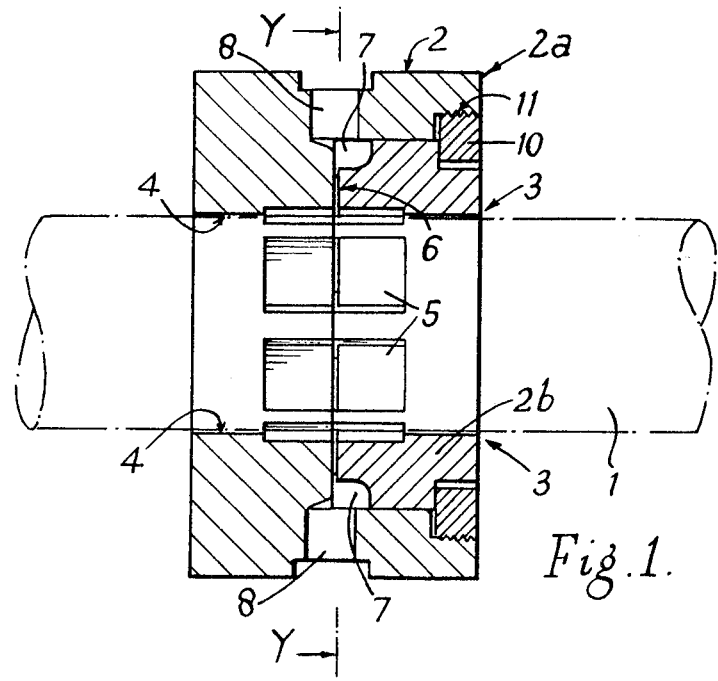
FIG. 1 is an axial section of a journal bearing, taken on the line X—X of FIG. 2.
Figure 2:
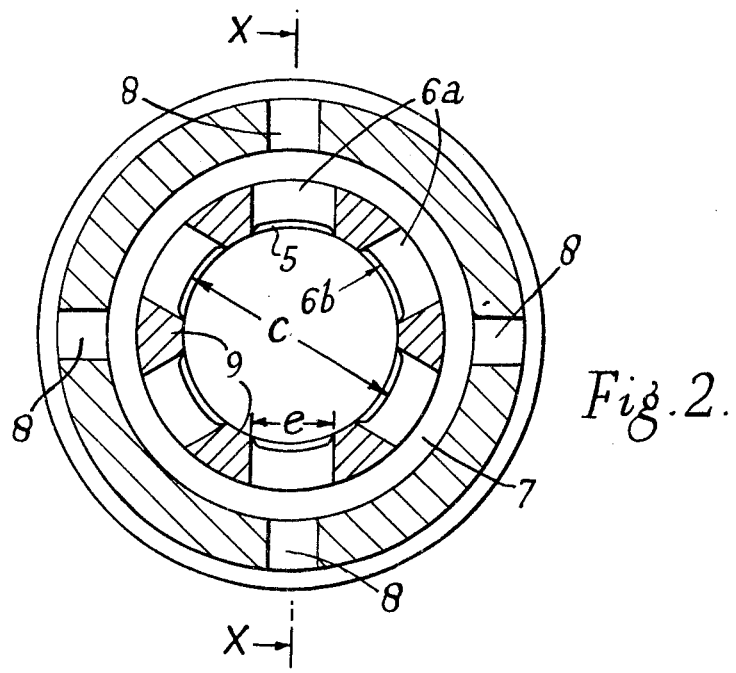
FIG. 2 is a radial section taken on the line Y—Y of FIG. 1.

In FIGS. 1 and 2 a cylindrical rotor 1 and a bearing stator 2 define between them a clearance 3. The stator 2 is composed of elements 2a and 2b, and the element 2b slides axially into a bore in the element 2a.

A bore 4 is formed partly in each of the elements 2a, 2b.

Equally in both of the elements there are formed bearing recesses 5 to which oil under pressure is fed to form liquid layers upon which the rotor shaft is supported. A metered supply of oil is fed to the recesses 5 through radial slots 6 (FIG. 1) defined between abutting end surfaces of the two elements 2a and 2b.

The oil is supplied to these slots from a common annular feed channel 7 communicating with an inlet port 8.

The slots 6 are angularly spaced and angularly elongated and are formed by making three milled recesses 6a, at 60° angular intervals, symmetrically across the radial end face of the bearing element 2b, see FIG. 2, leaving a series of lands 9 which are butted up against a plane radial end face of the other bearing element 2a.

The axial width of the slot 6a can be varied by lapping the axially-exposed surface of the lands 9.

The element 2b is kept firmly butted up against the element 2a by a locking ring 10 inserted in a threaded bore in the element 2a.

The slots 6 open at their radially inner end 6b into the bearing recesses 5 and the sum of the angular elongations e of the openings of the inner ends is a major proportion of the internal circumference c of the elements 2a, 2b.

If the bearing has a simple cylindrical or conical gap, without recesses 5, the slots open at the internal periphery of the elements 2a, 2b.

Figure 3:
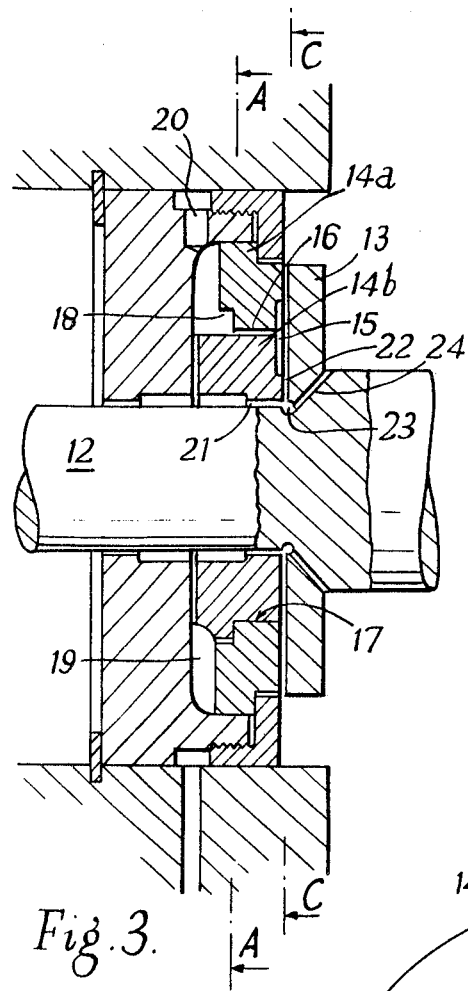
FIG. 3 is an axial section of a liquid bearing to show an axial thrust bearing, and is taken on the line B—B of FIG. 4.
Figure 4:
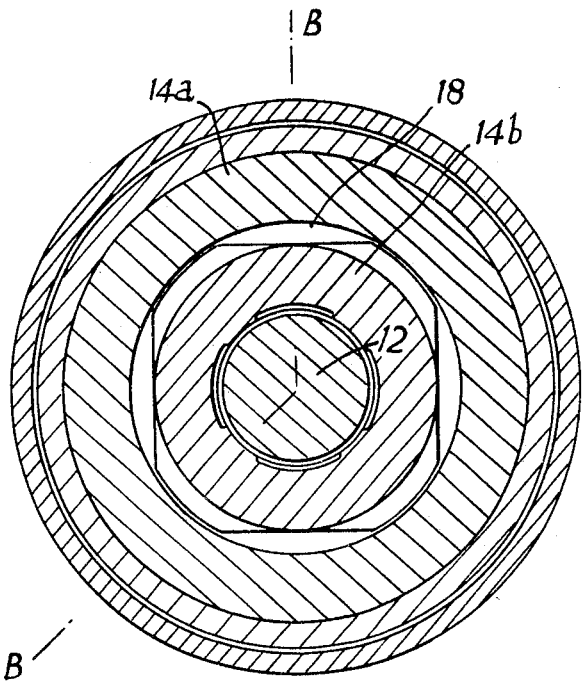
FIG. 4 is a radial section taken on the line A—A of FIG. 3.
Figure 5:
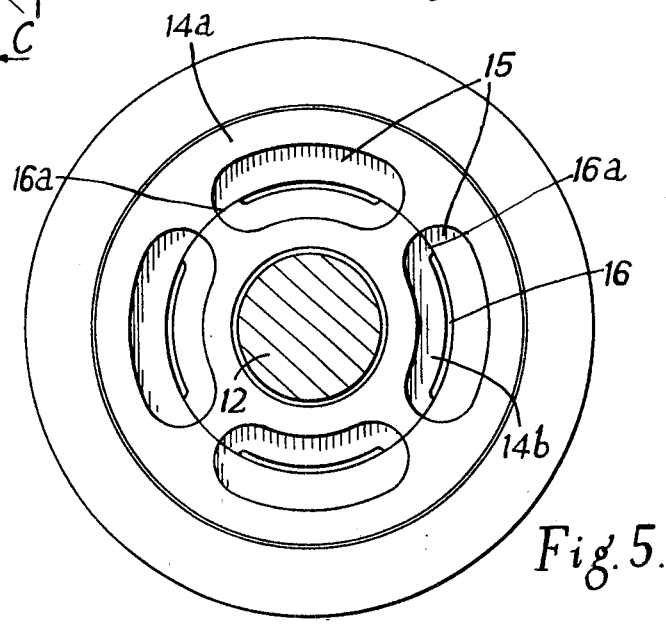
FIG. 5 is a radial section taken on the line C—C of FIG. 3.

In FIGS. 3, 4 and 5, an axial thrust liquid bearing comprises a rotor 12 with thrust bearing flange 13, and a stator including locked elements 14a and 14b. In the face of the stator elements opposed to the flange 13 there are provided pockets 15 to which bearing liquid is fed through respective slots 16 each formed by milling or grinding away an arcuate recess in an outside diameter of the element 14b which is thereafter fitted into an inside diameter 17 of the element 14a. These slots 16 are symmetrically and equally-angularly disposed about the axis of rotation, and are separated by lands 16a, and where they open to the bearing pockets 15 their total angular length is a major proportion of the circumference on which they lie. Each slot 16 is fed through an axial channel 18 formed by cutting element 14b along a respective chord, and each channel 18 receives bearing liquid from an annular feed passage 19 having an inlet 20. At the meeting point of the journal gap 21 and the thrust gap 22 there is provided an annular channel 23 having a number of vent holes 24 to atmosphere, to ensure that bleed of liquid from the journal bearing does not enter and interfere with operation of the thrust bearing.

The symmetrical positioning of the inlet slots ensures that the liquid enters normal to the bearing gap and so reduces to a minimum any tendency for rotational torque to be exerted. The lands between the the radial recesses provide an accurately machinable base against which the other element is positioned, thereby permitting the dimensions of the slots to be extremely precisely determined, and the dimensions of the slots are not sensitive to distortion under mechanical load. The lands prevent circumferential flow in the inlet, and the fact that the openings of the slots extend over the major part of the bearing periphery effectively eliminates the dispersion losses associated with the known orifices and capillaries and applies particularly to bearings without recesses or pockets. The width of the slots may be made similar to that of the bearing volume, so that the nature of flow is the same both in the slots and in the bearing volume. The bearing is accordingly insensitive to change in liquid characteristics, and does not move away from the optimum design condition when there is a change in liquid characteristics, e.g. as a result of change of temperature. Because of the relatively large cross-sectional area of the inlet slots, and the low liquid velocity therein, the bearing can be made to operate with very high supply pressures, making possible higher load capacity and stiffness than are possible with orifice bearings. The inlet slots are a closer approach to a theoretical continuous line source, as used in pressurised bearing theory, than a line of separate orifices, and more reliance can be placed on calculated performance. Accuracy of production of the slots may be achieved using standard machine tool equipment, as distinct from the special equipment required for making orifices and capillaries. The edges of the slots may be made sharp and accurate, i.e. avoiding inadvertent increases in cross-section leading to pneumatic hammer.

The use of the slotting technique permits the making of very small bearings for which the size of conventional orifices required would be too small to manufacture, and it also allows the use of refractory materials for bearings for corrosive liquids. Moreover, the bearing may be dismantled for cleaning the slots, and the provision of a plurality of slots reduces risk of blockage of the inlet.

I claim:

1. A rotary hydrostatic bearing comprising first and second relatively rotatable bearing members defining a bearing volume between them, one of said relatively rotatable members having therein a plurality of recesses which open at its surface bounding the bearing volume, said recesses extending axially and circumferentially and being disposed at angularly spaced intervals about the axis of said one bearing member, said one bearing member having therein a corresponding plurality of angularly-spaced angularly-elongated slots each of which opens at one of its ends into a respective one of said recesses, the sum of the angular elongation of said one ends of all of said slots, where they open into the respective recesses, being a major part of the circumference on which said one ends of all of said slots lie.

2. A rotary hydrostatic bearing, as claimed in claim 1, wherein said sum of the angular elongation of said one ends of all of said slots, where they open into the respective recesses, is greater than 75% of the circumference on which said one ends of all of said slots lie.

3. A rotary hydrostatic bearing, as claimed in claim 1, wherein said plurality of recesses and said plurality of slots are equally-angularly disposed about the axis of said one bearing member.

4. A rotary hydrostatic journal bearing, as claimed in claim 1, wherein said one bearing member includes two locked abutting elements in each of which respective portions of said recesses are formed, each said element having an axially-facing surface, and said respective axially-facing surfaces being opposed and said slots being defined between said opposed axially-facing surfaces.

5. A rotary hydrostatic bearing, as claimed in claim 4, wherein said axially-facing surface of one of said elements is a plane radial face, and wherein said axially-facing surface of the other of said elements is axially recessed.

6. A rotary hydrostatic journal bearing, as claimed in claim 5, wherein said axially-facing surface of the other of said elements has a plurality of axial recesses formed therein and arranged in diametrically opposed pairs with lands between neighbouring recesses.

References Cited

UNITED STATES PATENTS

| | | | |
|---|---|---|---|
| 3,368,850 | 2/1968 | Wilcox | 308—9 |
| 1,906,715 | 5/1933 | Penick | 308—9 |

MARTIN P. SCHWADRON, Primary Examiner

F. SUSKO, Assistant Examiner